(12) United States Patent
Lee et al.

(10) Patent No.: US 12,235,472 B2
(45) Date of Patent: Feb. 25, 2025

(54) DISPLAY DEVICE HAVING LIGHT PATH CONTROLLING MEMBER

(71) Applicant: LG DISPLAY CO., LTD., Seoul (KR)

(72) Inventors: Se-Jin Lee, Paju-si (KR);
Young-Woong Kim, Paju-si (KR);
Seung-Soo Yang, Paju-si (KR);
Min-Gyu Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 645 days.

(21) Appl. No.: 17/471,987

(22) Filed: Sep. 10, 2021

(65) Prior Publication Data

US 2022/0082855 A1 Mar. 17, 2022

(30) Foreign Application Priority Data

Sep. 11, 2020 (KR) .................. 10-2020-0117159

(51) Int. Cl.
*G02B 30/32* (2020.01)
*G06F 1/16* (2006.01)

(52) U.S. Cl.
CPC ........... *G02B 30/32* (2020.01); *G06F 1/1609* (2013.01)

(58) Field of Classification Search
CPC ... G02B 27/01–0189; G02B 2027/0105–0198; G02B 30/00–60; G06F 1/1609
See application file for complete search history.

(56) References Cited

U.S. PATENT DOCUMENTS

| | | | |
|---|---|---|---|
| 2006/0291185 A1 | 12/2006 | Atsushi | |
| 2008/0186558 A1* | 8/2008 | Lee | G02B 6/04 359/227 |
| 2015/0324083 A1* | 11/2015 | Ye | G06F 3/041 345/173 |
| 2015/0331276 A1* | 11/2015 | Katsuta | G02F 1/133528 349/61 |
| 2015/0370064 A1* | 12/2015 | Eguchi | G02B 3/0068 359/619 |
| 2017/0094815 A1 | 3/2017 | Chin et al. | |
| 2017/0140522 A1 | 5/2017 | Nam et al. | |

(Continued)

FOREIGN PATENT DOCUMENTS

| JP | H11-6786 A | 1/1999 |
|---|---|---|
| JP | 2013050563 A | 3/2013 |
| KR | 10-2007-0000955 A | 1/2007 |

(Continued)

OTHER PUBLICATIONS

Office Action dated Jan. 2, 2025 issued corresponding Korean Intellectual Property Application No. 10-2020-0117159.

*Primary Examiner* — Bao-Luan Q Le
*Assistant Examiner* — Christopher A Lamb, II
(74) *Attorney, Agent, or Firm* — Morgan, Lewis & Bockius LLP

(57) ABSTRACT

A display device includes a display panel including a plurality of pixel regions and displaying a picture; and a light path controlling member located on a front surface of the display panel and transmitting the picture output from the display panel, wherein the light path controlling member includes a plurality of separation walls and a plurality of light path portions between the plurality of separation walls, and wherein a period of the light path portion is different from a period of the pixel region.

8 Claims, 8 Drawing Sheets

(56) References Cited

U.S. PATENT DOCUMENTS

2018/0165494 A1  6/2018 Kim

FOREIGN PATENT DOCUMENTS

| KR | 10-0712182 B1 | 4/2007 |
| KR | 10-2009-0059032 A | 6/2009 |
| KR | 10-2017-0037773 A | 4/2017 |
| KR | 10-2017-0055709 A | 5/2017 |
| KR | 10-2018-0067226 A | 6/2018 |
| KR | 10-2020-0000568 A | 1/2020 |

* cited by examiner

DISPLAY DEVICE HAVING LIGHT PATH CONTROLLING MEMBER

CROSS REFERENCE TO RELATED APPLICATIONS

The present application claims the priority benefit of Korean Patent Application No. 10-2020-0117159 filed in Republic of Korea on Sep. 11, 2020, which is hereby incorporated by reference in its entirety for all purposes as if fully set forth herein.

BACKGROUND

Technical Field

The present invention relates to a display device having a light path controlling member, and particularly, relates to a display device which can prevent a moire from happening in a picture when shooting the picture for inspecting a display panel.

Discussion of the Related Art

Generally, for a display device, such as a liquid crystal display device or an organic light emitting display device, an inspection of a display panel is conducted during or after a manufacturing process. In the inspection of the display panel, a picture displayed on the display panel is shot by a camera (e.g., a CCD camera), and then the shot picture is analyzed and a picture defect such as a display stain is inspected.

However, in case of shooting a picture of a display panel using a camera, a moire happens in the shot picture by the camera. The moire means that, when shooting a picture which is output from pixel regions arranged in a regular lattice pattern, a low brightness and a high brightness happens alternately and repeatedly.

Because the moire has a high difference in light and shade, the moire becomes an obstacle when inspecting a defect such as a display stain of a display panel.

SUMMARY

Accordingly, embodiments of the present invention are directed to a display device that substantially obviates one or more of the problems due to limitations and disadvantages of the related art.

An aspect of the present disclosure is to provide a display device that can break a periodicity of a picture output from the display device and prevent a moire from happening in a shot picture when inspecting the display device. Another advantage of the present invention is to provide a display device which can improve a color uniformity according to a viewing direction.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises a display panel including a plurality of pixel regions and displaying a picture; and a light path controlling member located on a front surface of the display panel and transmitting the picture output from the display panel, wherein the light path controlling member includes a plurality of separation walls and a plurality of light path portions between the plurality of separation walls, and wherein a period of the light path portion is different from a period of the pixel region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiments of the invention and together with the description serve to explain principles of the disclosure. In the drawings.

DETAILED DESCRIPTION

Reference will now be made in detail to exemplary embodiments, examples of which are illustrated in the accompanying drawings. The same reference numbers may be used throughout the drawings to refer to the same or like parts.

Figure 1:
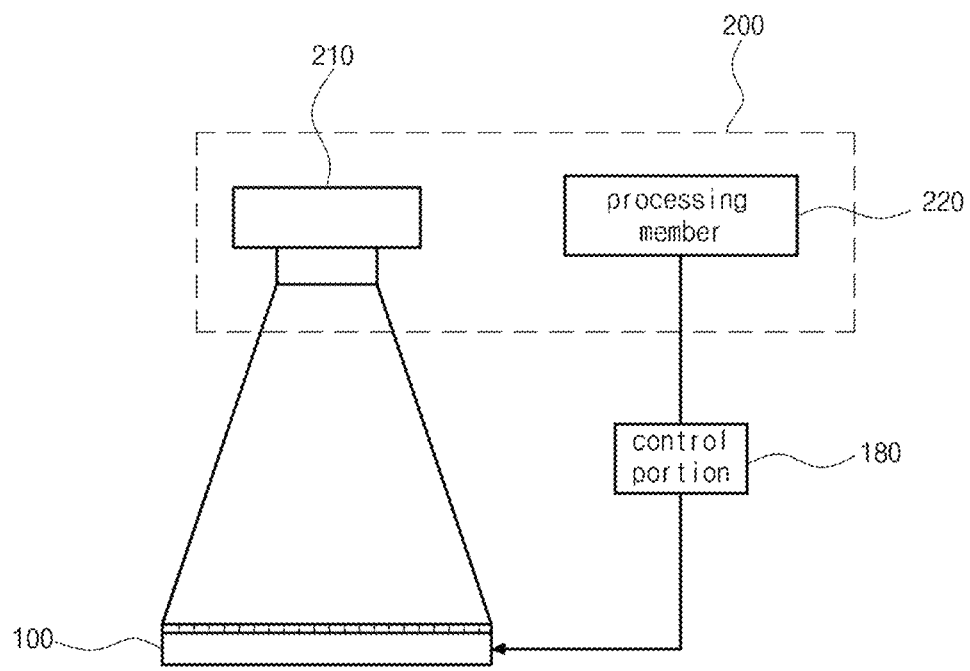
FIG. 1 is a view illustrating a method of inspecting a display device by an inspection apparatus according to the present invention.

FIG. 1 is a view illustrating a method of inspecting a display device by an inspection apparatus according to the present invention.

Referring to FIG. 1, the inspection apparatus of the present invention may include a shooting member 210 shooting a display device 100 located therebelow, and a processing member 220 which processes the picture shot by the shooting member 210 and detects a defect such as an abnormality of brightness or stain.

The shooting member 210 may include a camera 218, a lens system 215, a focusing member (not shown), and so on. The camera 218 is a member shooting a picture displayed on the display device 100 therebelow. The camera 218 may include, but not limited to, a CCD (Charged Coupled Device) camera.

The lens system 215 may include one or more lens, and make a picture, which is displayed on the display device 100, into parallel rays to be input to the camera 218. The lens system 215 may include a filter.

The focusing member may move the lens system 215 and the camera 218 together to focus on the picture displayed on the display device 100. The focusing member may include a fixing member to fix a lens and a moving member to move a lens vertically and/or horizontally.

The picture shot by the shooting member 210 is input to the processing member 220. The processing member 220 may process a shot picture input thereto and generate an information of the shot picture, and then may compare the processed information with a set information and decide a good quality of a display device or compensate for a picture.

For example, the processed information may be a brightness information. The processed brightness information is compared with a stored brightness information to calculate a difference value. When the calculated difference value is equal to or greater than a first set value, it is decided that a display device is defective, and a manufactured display device is discarded or a defect of a manufactured display device is removed through a process such as a repair or the like.

When the difference value of the brightness information is equal to or greater than a second set value and is less than the first set value, a defect being able to be removed by compensating for a picture is decided, and the processing member 220 calculates a compensation value corresponding to the difference value and then outputs the compensation value to a control portion 180.

The control portion 180 converts a picture data, which is supplied from an external system, based on the compensation value input from the processing portion 220, and then supplies the converted data to a data driving portion (not shown). Further, the data driving portion converts the input picture data into an analog picture signal, and then supplies the analog picture signal to a data line to display a compensated picture.

The control portion 180 may be located inside or outside the display device 100.

The inspection apparatus 200 for the display device 100 directly shoots a picture displayed on the display panel 110, and then processes the shot picture. Accordingly, the inspection apparatus 200 decides a defect of the display device 100 and compensates for a picture to display a high-quality picture.

The inspection of the display device 100 may be conducted in various steps. For example, the inspection may be conducted after completing the display panel 110, or may be conducted in a step of a display module in which a FPCB (Flexible Printed Circuit Board), which a data driving element and the control portion 180 are mounted on, and so on are attached to the display panel 110.

The display device 100 as the inspected object may be one of various display devices such as a liquid crystal display device, an organic light emitting display device, an electrophoresis display device, a mini LED (Light emitting diode) display device, and a micro LED display device.

Figure 2:
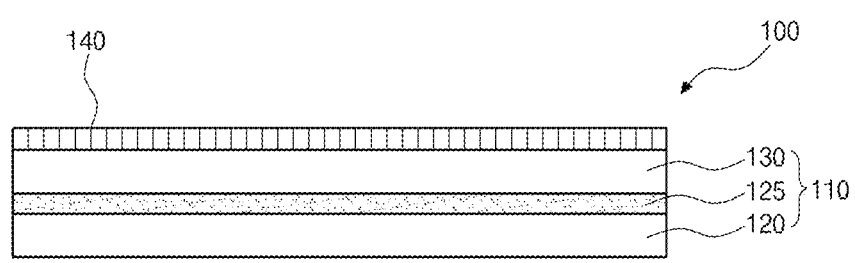
FIG. 2 is a view illustrating a display device according to a first embodiment of the present invention.

FIG. 2 is a view illustrating a display device as an object of an inspection apparatus according to a first embodiment of the present invention.

Referring to FIG. 2, the display device 100 of the first embodiment may include a display panel 110 and a light path controlling member 140 located on the display panel 110.

The display panel 110 may be, but not limited to, a liquid crystal panel, an organic light emitting display panel, an electrophoresis display panel, a mini LED display panel, or a micro LED display panel. However, the display panel 110 may be one of other known various display panels.

The display panel 110 may include a first substrate 120, a second substrate 130, and a display element 125 between the first and second substrates 120 and 130. The first and second substrates 120 and 130 may be formed of a solid transparent material such as a glass, or a flexible transparent material such as a plastic.

Even though not shown in the drawings, a plurality of data lines and a plurality of gate lines, which are arranged in vertical and horizontal directions, respectively, to define a plurality of pixel regions, may be formed at the first substrate 120. A thin film transistor as a switching element may be formed in each pixel region, and a pixel electrode may be formed on the pixel region.

The thin film transistor may include a gate electrode connected to the gate line, a semiconductor layer which is formed of an amorphous silicon, crystalline silicon or oxide semiconductor stacked on the gate electrode, and source and drain electrodes which are on the semiconductor layer and are connected to the data line and the pixel electrode, respectively.

In the case that the display panel 110 is an organic light emitting display panel, the display element 125 may include an organic light emitting element. The organic light emitting element may include a pixel electrode (i.e., a first electrode), an organic light emitting layer on the pixel electrode, and a second electrode on the organic light emitting layer. The first electrode may be an anode or cathode. The second electrode may be an anode or cathode.

In the case that the display panel 110 is a liquid crystal display panel, the display element 125 may include a liquid crystal layer. In the case that the display panel 110 is an electrophoresis display panel, the display element 125 may include an electrophoresis layer. In the case that the display panel 110 is a mini LED display panel or micro LED display panel, the display element 125 may include a mini LED or micro LED.

Further, in the case that the display panel 110 is an organic light emitting display panel, an encapsulation layer to prevent a penetration of an external moisture or substance may be formed on the organic light emitting element. The encapsulation layer may include at least one inorganic layer and at least one organic layer, for example, a stack structure of inorganic layer/organic layer or inorganic layer/organic layer/inorganic layer. The second substrate may be formed of a transparent film such as a PS (Polystyrene) film, PE (Polyethylene) film, PEN (Polyethylene Naphthalate) film, or PI (Polyimide) film.

In the case that the display panel 110 is a liquid crystal display panel, a color filter which has sub-color filters to display red (R), green (G) and blue (B), a black matrix which divides the sub-color filters and blocks a light passing through a liquid crystal layer, and a common electrode may be formed at the second substrate 130. The color filter and the common electrode may be formed at the first substrate 120.

The light path controlling member 140 may be, but not limited to, a transparent adhesive such as an OCA (Optically Clear Adhesive) or OCR (Optically Clear Resin). The light path controlling member 140 may be directly formed on a top surface of the display panel 110.

Even though explained in detail below, when the display device 100 is shot and inspected by the shooting member 210 of the inspection apparatus 200, the light path controlling member 140 prevents a moire from happening in a picture displayed on the display panel 110 and shot by a camera.

As described above, the inspection apparatus 200 for the display device 100 shoots a picture displayed on the display panel 110 and detects a defect such as a stain. Then, the inspection apparatus 200 decides a good quality of a picture according to an extent of a defect, or calculates a compensation value corresponding to the stain or the like and compensate for a picture to display a picture, in which the defect such as the stain is removed, on the display panel 110.

However, when a picture displayed on the display panel 110 is shot by the camera, the picture shot by the camera is different from the picture displayed on the display panel 110. In other words, pixel regions arranged periodically at the display panel 110 and optical sensors (i.e., camera sensors) arranged periodically at the camera periodically interferes with each other, and thus a moire, which has a high brightness region and a low brightness region produced alternately and periodically, happens in the shot picture.

Because good picture quality of the display device 100 is decided or a picture is compensated based on the shot picture having a moire, accurate decision of a good picture quality is impossible Further, a stain is not removed but is much produced in the compensated picture, or a moire having a high brightness and a low brightness alternated happens even in a displayed picture.

Figure 3:
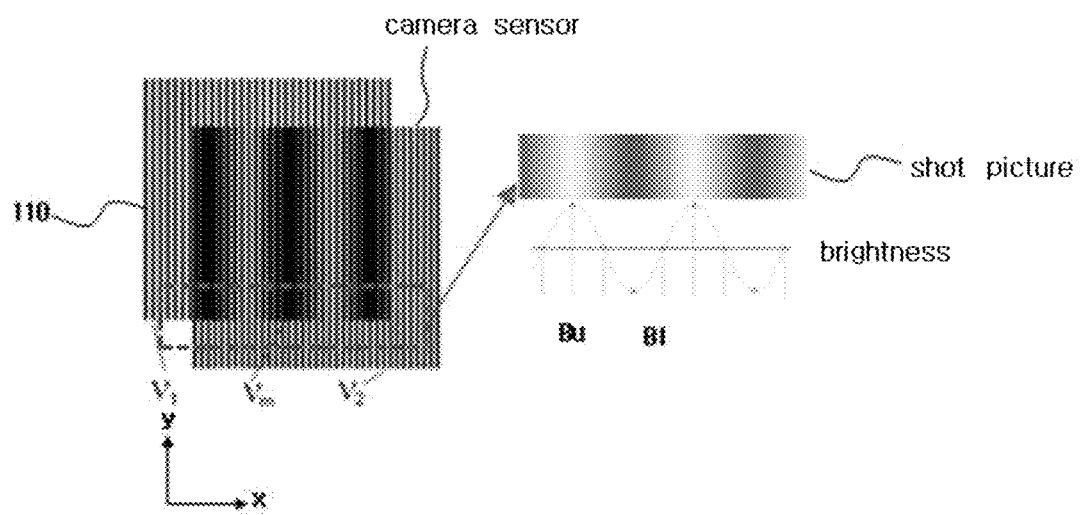
FIG. 3 is a view illustrating a moire happening in a picture shot by an inspection apparatus.

FIG. 3 is a view illustrating a moire happening in a picture shot by an inspection apparatus.

Referring to FIG. 3, a plurality of pixel regions are formed in a lattice manner and arranged periodically and repeatedly in x and y directions. Sensors of a camera shooting a picture displayed on the display panel 110 are arranged repeatedly in x and y directions.

The display panel 110 displays a picture having brightnesses corresponding to picture signals at a plurality of pixel regions. In other words, a picture displayed on the display panel 110 has no defect such as a moire. However, in the case that a picture output from the display panel 110 is input to the camera of the shooting member 210, when the picture output from the plurality of pixel regions of the display panel 110 having a periodicity is input to the camera sensors arranged periodically and repeatedly, a moire having a high brightness Bh and a low brightness Bl alternated and repeated happens by the pixel regions arranged periodically and the camera sensors arranged periodically, and the shot picture having the moire is recorded in the camera.

Thus, the processing portion 220 of the inspection apparatus 200 does not process a picture actually displayed on the display panel but processes the shot picture having the moire, and then performs a decision of good picture quality and a picture compensation. Accordingly, accurate decision of good picture quality and accurate compensation for the display device 100 are impossible.

The light path controlling member 140 prevents a moire from happening in a shot picture when the camera shooting a picture of the display panel 110. Because the moire happening in the shot picture is caused by a periodic interference of the pixel regions of the display panel 110 and the camera sensors, the light path controlling member 140 removes the periodic interference between the pixel regions of the display panel 110 and the camera sensors and prevents the moire from happening.

Figure 4A:
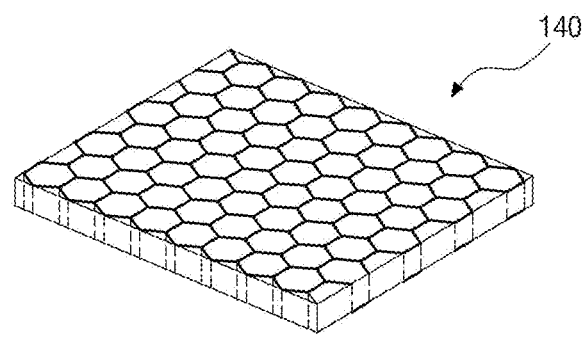
FIGS. 4A and 4B are a perspective view and a cross-sectional view schematically illustrating a light path controlling member according to the first embodiment of the present invention.
Figure 4B:
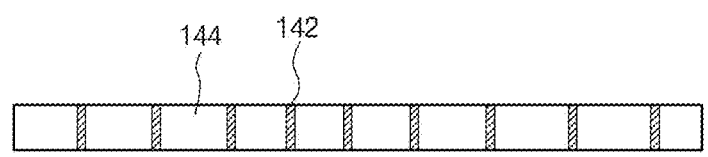

FIGS. 4A and 4B are a perspective view and a cross-sectional view schematically illustrating a light path controlling member according to the first embodiment of the present invention.

Referring to FIGS. 4A and 4B, the light path controlling member 140 may be formed in, but not limited to, an approximately quadrangular shape. The light path controlling member 140 may have other shape than the quadrangular shape. Because the light path controlling member 140 is attached to a front surface of the display panel 110 and transfers a picture output from the display panel 110 to the outside, the light path controlling member 140 may have the same shape as the display panel 110.

For example, in the case that the display panel 110 has a rectangular shape, the light path controlling member 140 also has a rectangular shape. In the case that the display panel 110 has a square shape, the light path controlling member 140 also has a square shape.

Particularly, the display device 100 is recently formed to have various shapes because the display device 100 is applied to various fields such as a dashboard of an automotive. Accordingly, the light path controlling member 140 may have various shapes in accordance with various shapes of the display panel 110.

The light path controlling member 140 may have a size a little bit greater than that of the display panel 110 so that the light path controlling member 140 may completely cover the display panel. 110. Alternatively, the light path controlling member 140 may have the same size as the display panel 110.

As shown in the drawings, the light path controlling member 140 is divided by a separation wall 142 so that the light path controlling member 140 includes a plurality of light path portions 144 which a picture output from the display panel 110 proceeds (or is transmitted by). The separation wall 142 reflects a picture proceeding along the light path portion 144 to always make the picture proceed in a certain direction through the light path portion 144.

As shown in the drawings, a cross-sectional shape of the light path portion 144 defined by the separation wall 142 may be, but not limited to, a hexagonal shape. The cross-sectional shape of the light path portion 144 may be other various shapes such as a square shape, a rectangular shape, a circular shape and an elliptical shape. Particularly, the cross-sectional shape of the light path portion 144 may be varied as required. For example, the cross-sectional shape of the light path portion 144 may be formed to have a shape of the display panel or a shape of the pixel region.

The light path portion 144 may be formed of, but not limited to, an optical fiber of a glass such as a quartz or a polymeric material. The light path portion 144 may be formed of any material which transmits a light smoothly without loss. For example, a polymeric material, such as PMMA (Polymethyl Methacrylate), having a good light guiding property may be used for the light path portion 144.

When a picture is delivered through the light path portion 144, the separation wall 142 totally reflects a picture input from the light path portion 144 to the light path portion 144 to always make the picture output through the light path portion 144. The separation wall 142 is made of a material having a refractive index less than that of the light path portion 144, and due to the difference of refractive index, a light proceeding in the light path portion 144 is totally reflected by the separation wall 142. The separation wall 142 may be formed of, but not limited to, a polymeric material having a refractive index less than that of the light path portion 144.

Further, one light path portion 144 may be filled with one light guiding material, which is formed in a single body and has an area similar to a cross-sectional area of the light path portion 144, for example, one optical fiber, or may be filled with a plurality of light guiding materials, for example, a plurality of optical fibers with no empty space.

Figure 5:
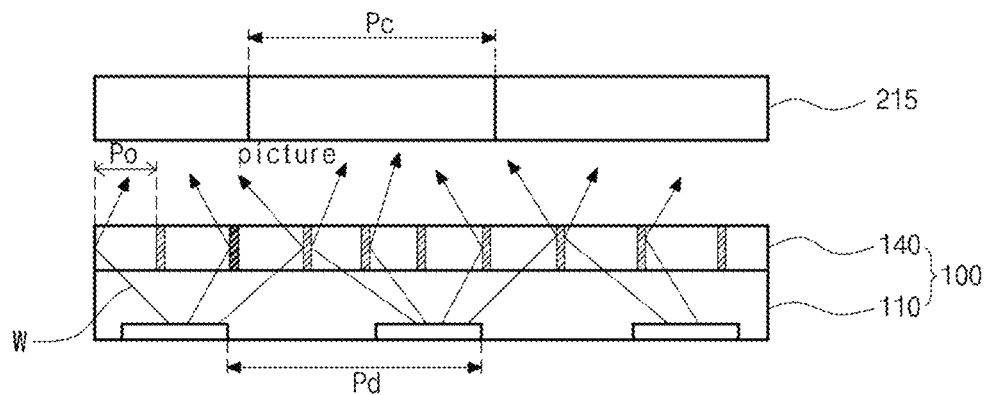
FIG. 5 is a view illustrating a periodicity of a picture displayed on a display panel being lost when a light path controlling member being located in a display device according to the first embodiment of the present invention.

FIG. 5 is a view illustrating a periodicity of a picture displayed on a display panel being lost when a light path controlling member being located in a display device according to the first embodiment of the present invention. For the purpose of explanations, a structure of a camera sensor 215 of a shooting member 210 is shown simply.

Referring to FIG. 5, the light path controlling member 140 is located on a front surface of the display panel 110 and delivers a picture output from the display panel 110 to the outside. The camera sensors 215 are located over a front surface of the light path controlling member 140 and shoot a picture delivered by and input from the light path controlling member 140.

A period Pd of the pixel region of the display panel 110 is almost similar to a period Pc of the camera sensor 215. When a picture displayed on the display panel 110 is shot by the camera sensor 215, an interference is caused by the pixel region and the camera sensor 215 having similar periods, and thus a moire happens in a shot picture.

However, a period Po of the light path controlling member 140 i.e., a period of the light path portion 144 of the light path controlling member 140 is much less than the period Pd of the pixel region and the period Pc of the camera sensor 215 (Po<Pd and Pc). For example, the period Pd of the pixel region of the display panel 110 may be tens of micrometers and the period Po of the light path portion 144 of the light path controlling member 140 may be a few micrometers, and thus the period Po of the light path controlling member 140 is a few times less than the period Pd of the pixel region of the display panel 110.

The period Po of the light path controlling member 140 may be less than ½ of the period Pd of the pixel region and the period Pc of the camera sensor 215 (Po<Pd/2 or Po<Pc/2). Further, the period Po of the light path controlling member 140 may be greater than ⅕ of the period Pd of the pixel region and the period Pc of the camera sensor 215 (Pd/5<Po or Pc/5<Po). However, it is not limited, the period Po of the light path portion 144 of the light path controlling member 140 may be less than ⅕ of the period Pd of the pixel region and the period Pc of the camera sensor 215 (Po<Pd/5 or Po<Pc/5).

In the drawings, the period Po of the light path controlling member 140 is formed periodically all over the light path controlling member 140, but it is not limited. The period Po of the light path controlling member 140 may be formed non-periodically.

Since the light path controlling member 140 having the period Po different from the period Pd of the pixel region of the display panel 110 and the period Pc of the camera sensor 215 is located on the front surface of the display panel 110, a picture output from the display panel 110 is delivered through the light path portion 144 of the light path controlling member 140. Because a picture output from one pixel region is transmitted through a plurality of light path portions 144 of the light path controlling member 140, a periodicity of a light output from the pixel region arranged periodically in the display panel 110 is lost by the plurality of light path portions 144.

As a result, a moire does not happen in a picture which is displayed from the display panel 110, then is transmitted through the light path controlling member 140, and then is input to and shot by the camera sensor 215 of the shooting member 210, and thus an inspection defect due to a moire can be prevented.

As described above, in the display device 100 of this embodiment, the light path controlling member 140 is located on the front surface of the display panel 110 and a periodicity of a picture output from the display device 100 is lost. Accordingly, because an interference of a picture having a periodicity with the camera sensors 215 arranged periodically can be prevented, a moire happening in a shot picture can be prevented effectively.

Figure 6A:
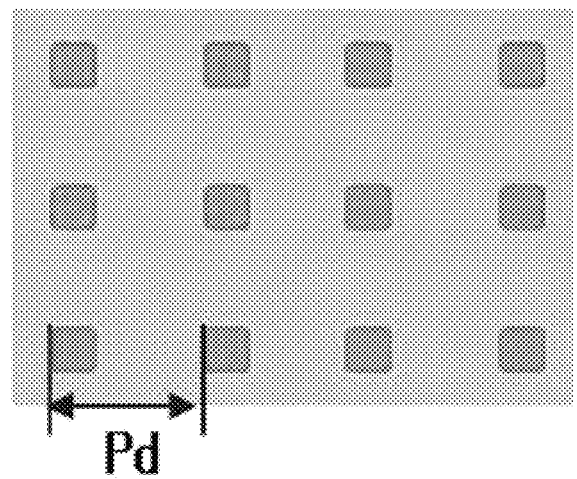
FIG. 6A is a view illustrating a picture displayed on a display device in case of no light path controlling member being employed.
Figure 6B:
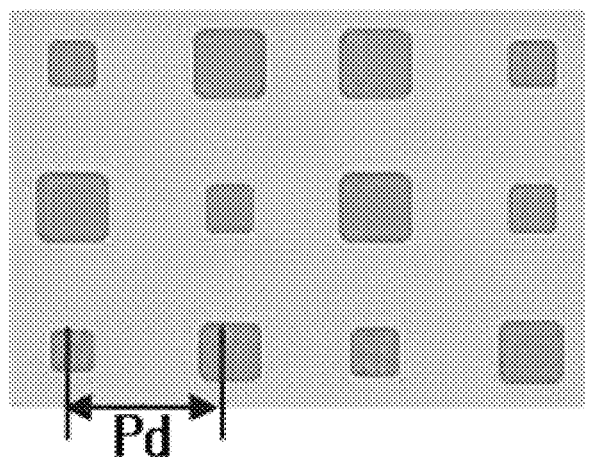
FIG. 6B is a view illustrating a picture displayed on a display device according to the first embodiment of the present invention.
Figure 7A:
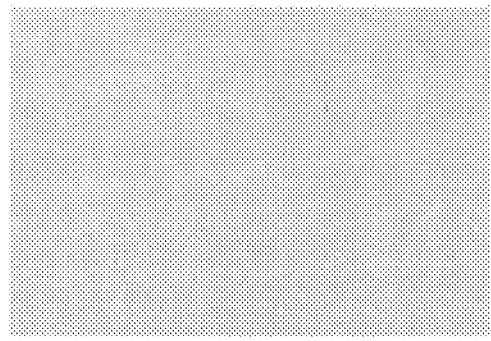
FIG. 7A is a view illustrating a picture shot by a camera of an inspection apparatus for a picture displayed on a display device in case of no light path controlling member being employed.
Figure 7B:
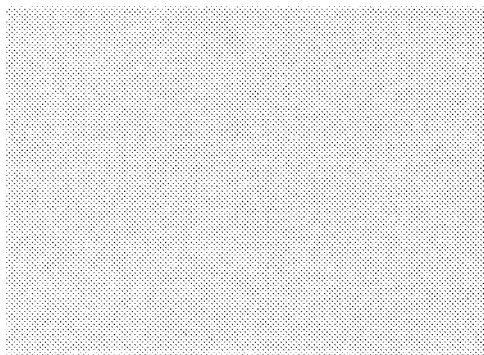
FIG. 7B is a view illustrating a picture shot by a camera of an inspection apparatus for a picture displayed on a display device according to the first embodiment of the present invention.

FIG. 6A is a view illustrating a picture displayed on a display device in case of no light path controlling member being employed, and FIG. 6B is a view illustrating a picture displayed on a display device in case of a light path controlling member being employed according to the first embodiment of the present invention. FIG. 7A is a view illustrating a picture shot by a camera of an inspection apparatus for a picture displayed on a display device in case of no light path controlling member being employed, and FIG. 7B is a view illustrating a picture shot by a camera of an inspection apparatus for a picture displayed on a display device in case of a light path controlling member being employed according to the first embodiment of the present invention.

A picture displayed on the display device is a test picture. The test picture is shown in a rectangular shape in the drawings, but may be varied depending on a purpose of test.

A relation of the period Po of the light path portion 144 of the light path controlling member 140 of the display device 100 and a period Pd of the pixel region of the display panel 110 is Po=Pd/2.6.

Referring to FIG. 6A, in the display device having no light path controlling member 140, pictures of equal size are arranged regularly at equal periods. The period of the picture is equal to the period Pd of the pixel region of the display panel 110.

In the display device having no light path controlling member 140, because the pictures are arranged periodically, when the pictures are input to the shooting member 210, the pictures arranged periodically interfere with the camera sensors 215 arranged periodically. Thus, as shown in FIG. 7A, a high moire having a high brightness and low brightness arranged periodically happens in the shot picture.

Referring to FIG. 6A, in the display device 100 of the first embodiment, because pictures are arranged at equal periods but have different sizes, distances between boundaries of actual pictures are not equal but different all over the screen. Accordingly, because a periodicity of the pictures displayed on the display device 100, when the pictures are input to the shooting member 210, an interference of the pictures with the camera sensors 215 arranged periodically is minimized. However, in the display device 100 of this embodiment, because the pictures are not displayed in a fully non-periodic or irregular manner, a moire is not removed fully from the shot picture but a low moire happens in the shot picture as shown in FIG. 7B.

Figure 8:
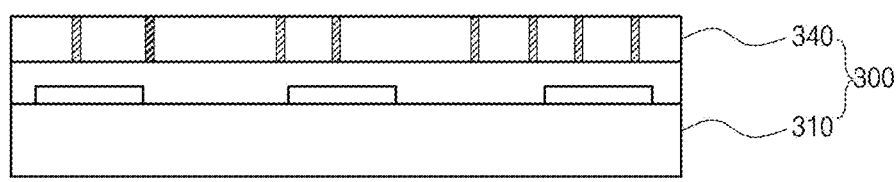
FIG. 8 is a view illustrating a structure of a display device according to a second embodiment of the present invention.

FIG. 8 is a view illustrating a structure of a display device according to a second embodiment of the present invention.

Referring to FIG. 8, the display device 300 may include a display panel 310 and a light path controlling member 340 located on the display panel 310.

The display panel 310 may be, but not limited to, a liquid crystal panel, an organic light emitting display panel, an electrophoresis display panel, a mini LED display panel, or a micro LED display panel. However, the display panel 310 may be one of other known various display panels.

Even though not shown in the drawings, the display panel 310 may include a first substrate, a second substrate, and a display element between the first and second substrates.

A plurality of pixel regions are arranged repeatedly and periodically in the display panel 310. A plurality of light path portions 344 of the light path controlling member 340 are arranged non-periodically or irregularly.

In other words, while the light path portions 144 of the light path controlling member 140 of the first embodiment are arranged periodically, the light path portions 344 of the light path controlling member 340 of this embodiment are arranged non-periodically or irregularly.

As such, the light path portions 344 of the light path controlling member 340 of this embodiment being arranged non-periodically or irregularly is because of following reasons.

In the first embodiment, the light path portions 144 of the light path controlling member 140 of the first embodiment are arranged periodically, but the period Po of the light path portions 144 of the light path controlling member 140 is less than the period Pd of the pixel regions of the display panel 110 (Po<Pd). Thus, in the first embodiment, even though the light path portions 144 of the light path controlling member 140 of the first embodiment are arranged periodically, because of a difference of the period Po of the light path portions 144 of the light path controlling member 140 and the period Pd of the pixel regions of the display panel 110, the periodicity of the picture output from the display panel 110 and delivered through the light path controlling member 140 is lost not fully but partially.

Thus, when shooting a picture output from the display device 100 of the first embodiment using the inspection apparatus 200, a picture input to the inspection apparatus 200 and a camera sensor interferes with each other not fully but partially. While the display device 100 can reduce an interference compared with the case of no light path controlling member 140 being employed, a partial interference of a picture input to the inspection apparatus 200 with the camera sensor is produced and thus a moire of a shot picture cannot be removed fully.

However, in this embodiment, because the light path portions 344 of the light path controlling member 340 are arranged non-periodically or irregularly, a periodicity of a picture output from the display panel 310 and delivered through the light path controlling member 340 to the inspection apparatus is lost fully. Accordingly, a picture input to the inspection apparatus and the camera sensor do not fully interfere with each other, and thus a moire of a shot picture can be removed fully.

Particularly, in this embodiment, when the light path controlling member 340 is satisfied with following conditions, a periodicity of a picture output from the display panel 310 and delivered through the light path controlling member 340 to the inspection apparatus is lost fully.

$$P_{Oc} = (1/k) \times P_d.$$ Condition 1

$$\frac{P_d}{k+0.1} \leq P_O \leq \frac{P_d}{k-0.1}.$$ Condition 2

Po is an individual period of the light path portions 344 of the light path controlling member 340, Poe is an average period of the light path portions 344 of the light path controlling member 340, Pd is a period of the pixel regions of the display panel 310, and k is a period ratio of the light path portions 344 of the light path controlling member 340 and the pixel regions of the display panel 310, wherein 2.6≤k≤3.0.

In this embodiment, when a relation of the period Po of the light path portions 344 of the light path controlling member 340 and the period Pd of the pixel regions of the display panel 310 is Pd/3.1≤Po≤Pd/2.5, a periodicity of a picture displayed on the display device 300 is lost fully and thus a moire does not happen in a shot picture. In other words, in this embodiment, the light path portions 344 of the light path controlling member 340 are formed to be arranged non-periodically or irregularly along with satisfaction with the conditions 1 and 2, and thus a moire of a shot picture can be removed.

Figure 9A:
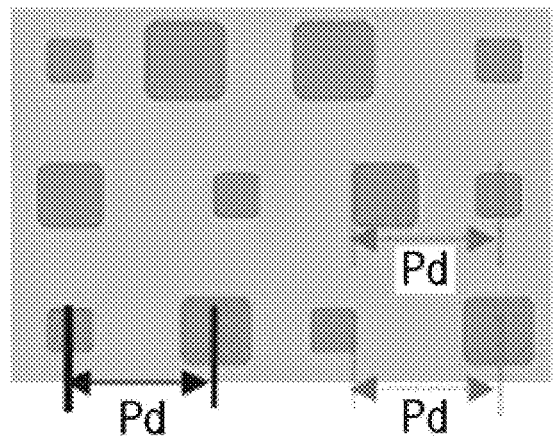
FIGS. 9A to 9C are views conceptually illustrating pictures displayed on a display device according to a relation of a period of light path portions of a light path controlling member and a period of pixel regions of a display panel.
Figure 9B:
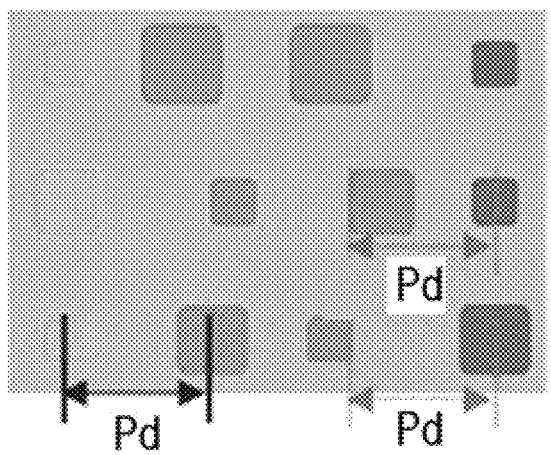
Figure 9C:
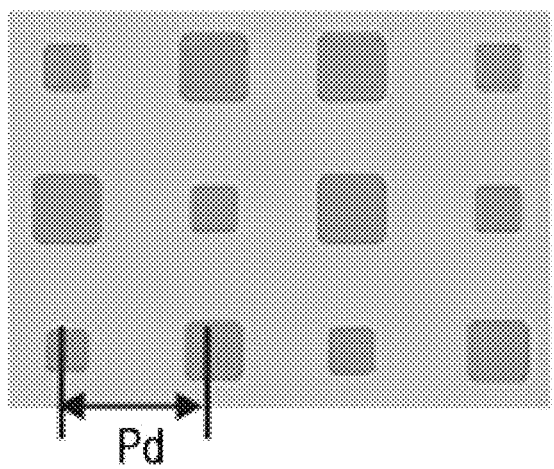

FIG. 9A is a view conceptually illustrating pictures displayed on a display device in case that a relation of a period of light path portions of a light path controlling member and a period of pixel regions of a display panel is Pd/3.1≤Po≤Pd/2.5 (i.e., 2.6≤k≤3.0), FIG. 9B is a view conceptually illustrating pictures displayed on a display device in case that a relation of a period of light path portions of a light path controlling member and a period of pixel regions of a display panel is Po<Pd/3.1, and FIG. 9C is a view conceptually illustrating pictures displayed on a display device in case that a relation of a period of light path portions of a light path controlling member and a period of pixel regions of a display panel is Pd/2.5<Po.

Figure 10A:
FIGS. 10A to 10C are views illustrating pictures shot by a camera according to a relation of a period of light path portions of a light path controlling member and a period of pixel regions of a display panel.
Figure 10B:
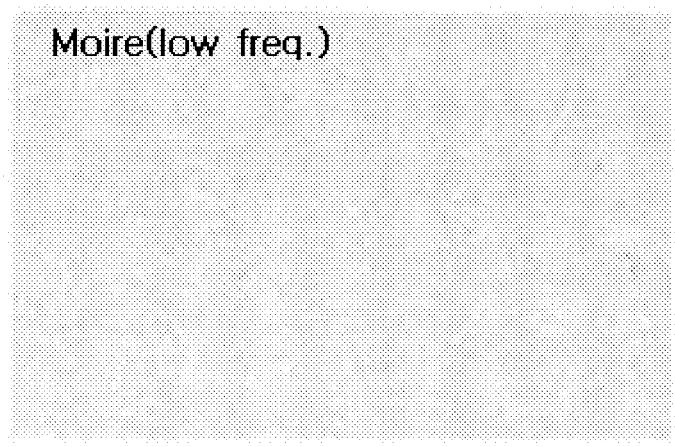
Figure 10C:
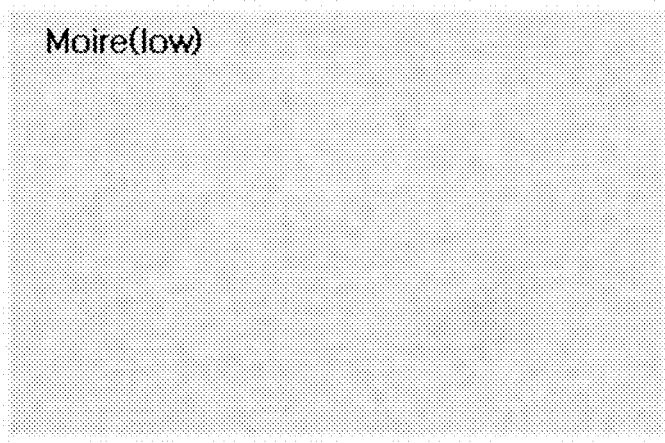

FIG. 10A is a view illustrating shot pictures input to camera sensors of an inspection apparatus in case that a relation of a period of light path portions of a light path controlling member and a period of pixel regions of a display panel is Pd/3.1≤Po≤Pd/2.5, FIG. 10B is a view illustrating shot pictures input to camera sensors of an inspection apparatus in case that a relation of a period of light path portions of a light path controlling member and a period of pixel regions of a display panel is Po<Pd/3.1, and FIG. 10C is a view illustrating shot pictures input to camera sensors of an inspection apparatus in case that a relation of a period of light path portions of a light path controlling member and a period of pixel regions of a display panel is Pd/2.5<Po.

Referring to FIG. 9A, in the case that a relation of a period Po of light path portions 344 of a light path controlling member 340 and a period Pd of pixel regions of a display panel 310 is Pd/3.1≤Po≤Pd/2.5, the pictures output from respective pixel regions are displayed different in size and in period.

In this case, a periodicity of the pictures displayed on the display device 300 is lost fully, and thus no moire happens in the shot picture as shown in FIG. 10A. Accordingly, a decision of a good picture quality of the display device 300 and a picture compensation of the display device 300 by the inspection apparatus 200 can be performed without errors.

Referring to FIG. 9B, in the case that a relation of a period Po of light path portions 344 of a light path controlling member 340 and a period Pd of pixel regions of a display panel 310 is Pd/2.5<Po, the pictures output from respective pixel regions are displayed different in size and in period.

However, regarding the pictures displayed on such the display device 300, because of an interaction of the light path controlling member 340 and the display panel 310, a moire happens in the shot picture as shown in FIG. 10B. Particularly, in this case, because of an interaction of the light path controlling member 340 and the display panel 310, a low-frequency moire happens in the shot picture. Because the low-frequency moire has a very high recognition degree, a decision of a good picture quality of the display device 300 and a picture compensation of the display device 300 by the inspection apparatus 200 have errors.

Referring to FIG. 9C, in the case that a relation of a period Po of light path portions 344 of a light path controlling member 340 and a period Pd of pixel regions of a display panel 310 is Po<Pd/3.1, the pictures output from respective pixel regions are displayed different in size but equal in period.

Accordingly, because a periodicity of the pictures displayed on the display device 300 is lost partially, a moire happens in the shot picture as shown in FIG. 10C, there is a limit to solving errors produced in a decision of a good picture quality of the display device 300 and a picture compensation of the display device 300 by the inspection apparatus 200.

As such, in this embodiment, by making the period Po of the light path portions 344 of the light path controlling member 340 non-periodic or irregular, a periodicity of the pictures displayed on the display panel 310 is removed and a moire happening in the shot picture can be prevented. Particularly, in this embodiment, the period Pd of the pixel regions of the display panel 310 is made non-periodic or irregular in a range of Pd/3.1≤Po≤Pd/2.5, and thus a moire happening in the shot picture can be prevented. As a result, errors being produced in a decision of a good picture quality of the display device 300 and a picture compensation of the display device 300 by the inspection apparatus 200 can be prevented.

Further, in this embodiment, because the light path controlling member 340 is located on the front surface of the display panel 310, a moire happening in the shot picture can be prevented, and further, a color uniformity of a picture according to a viewing direction can be improved, which is explained in detail as follows.

Figure 11A:
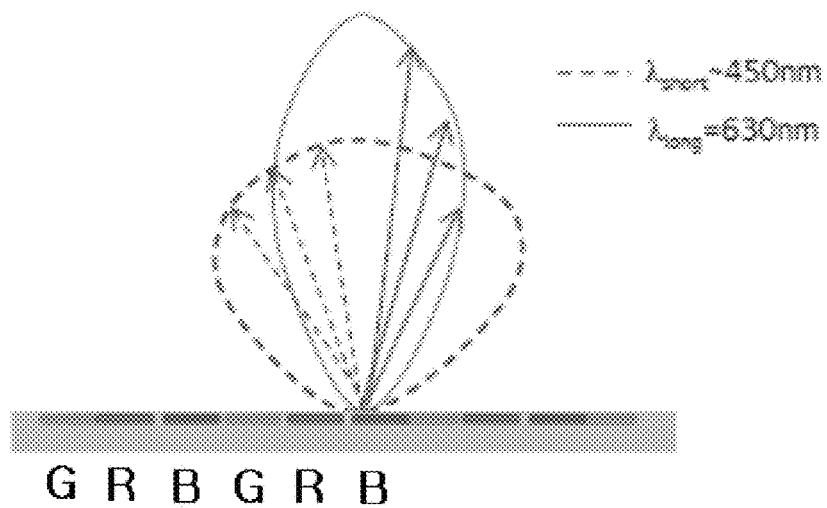
FIG. 11A is a view illustrating a color uniformity of a picture according to a viewing direction in a display device having no light path controlling member.
Figure 11B:
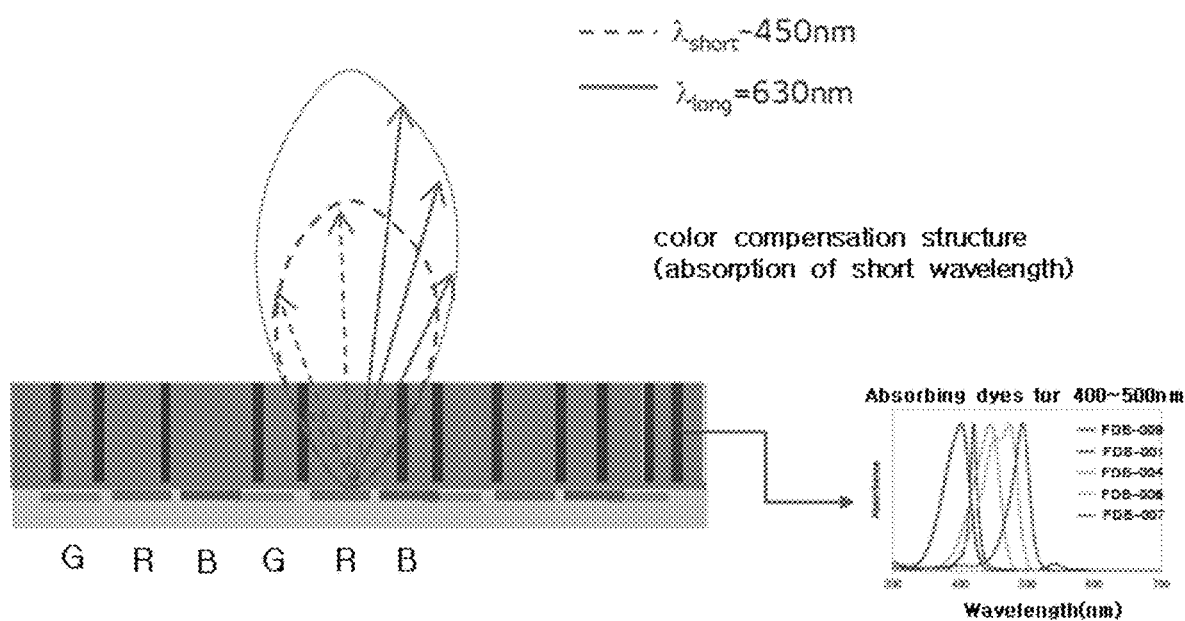
FIG. 11B is a view illustrating a color uniformity of a picture according to a viewing direction in a display device according to the second embodiment of the present invention.

FIG. 11A is a view illustrating a color uniformity of a picture according to a viewing direction in a display device having no light path controlling member, and FIG. 11B is a view illustrating a color uniformity of a picture according to a viewing direction in a display device having a light path controlling member according to this embodiment of the present invention.

Referring to FIG. 11A, in the case that no light path controlling member is located on the front surface of the display panel, regarding pictures output from the display panel, monochromatic lights of shorter wavelength have wider output angles which the monochromatic lights spread out at while monochromatic lights of longer wavelength have narrower output angles which the monochromatic lights spread out at.

Accordingly, the monochromatic light of red is output at a narrow angle while the monochromatic light of blue is output at a wide angle. Thus, in the case that a picture of a red light and a blue light is output, a color (i.e., a mixture of the red light and the blue light) of a picture recognized by a user is different depending on a viewing positon. In other words, in the display device having no light path controlling member 340, because the same picture is recognized with different colors depending on viewing directions, it is problematic that a color uniformity being reduced.

Referring to FIG. 11B, in the case of the display device 300 including the light path controlling member 340 located on the front surface of the display panel, the monochromatic lights from the display panel are output at different angles.

However, in this embodiment, because the picture i.e., the monochromatic lights from the display panel is transmitted and output through the light path portion 344 of the light path controlling member 340, the output range of the monochromatic lights is limited by the width of the light path portion 344. Accordingly, because all of the monochromatic lights having different wavelengths have limited output angles by the light path portion 344 of the light path controlling member 340, all of the monochromatic lights having different wavelengths are output at the same range of output angle.

Accordingly, the same color is recognized in an output range of picture of the light path portions 344, and thus a picture having a constant color uniformity can be recognized at all viewing directions.

Figure 12:
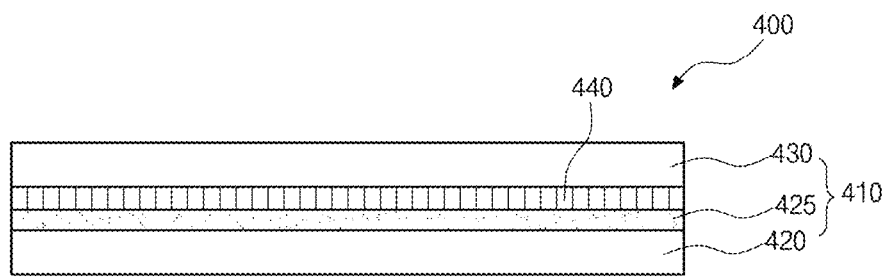
FIG. 12 is a view schematically illustrating a display device according to a third embodiment of the present invention.

FIG. 12 is a view schematically illustrating a display device according to a third embodiment of the present invention.

Referring to FIG. 12, the display device 400 may include a display panel 410 displaying a picture and a light path controlling member 440 located in the display panel 410.

The display panel 410 may include a first substrate 420, a second substrate 430, and a display element 425 between the first and second substrates 420 and 430.

The display panel 410 may be, but not limited to, a liquid crystal panel, an organic light emitting display panel, an electrophoresis display panel, a mini LED display panel, or a micro LED display panel. However, the display panel 410 may be one of other known various display panels.

Because the light path controlling member 440 includes light path portions formed non-periodically, lights output from the display panel 410 is displayed with periodicity thereof lost. Accordingly, a moire does not happen in a shot picture when being shot by an inspection apparatus, and an error of inspection can be prevented. Further, a color uniformity according to a viewing direction can be improved.

The light path controlling member 440 may be attached onto a bottom surface of the second substrate 430 i.e., a surface of the second substrate 430 facing the first substrate 420, and then may be coupled to the first substrate 420, thereby manufacturing the display device 400. Further, an insulating layer may be formed on display element 425, then the light path controlling member 440 may be attached onto the insulating layer, and then the second substrate 430 may be coupled to the light path controlling member 440, thereby manufacturing the display device 400.

Figure 13A:
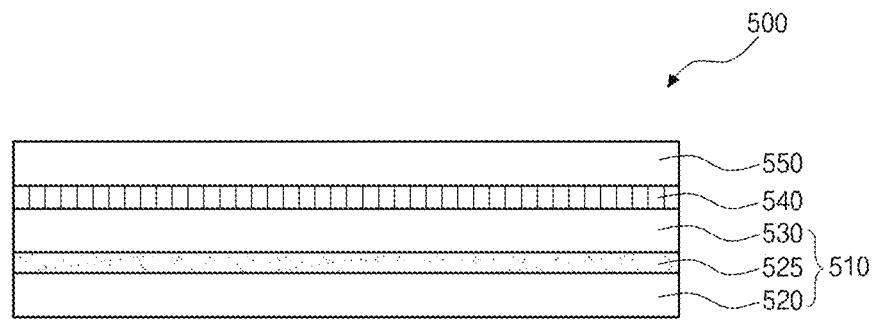
FIGS. 13A and 13B are views schematically illustrating display devices according to a fourth embodiment of the present invention.
Figure 13B:
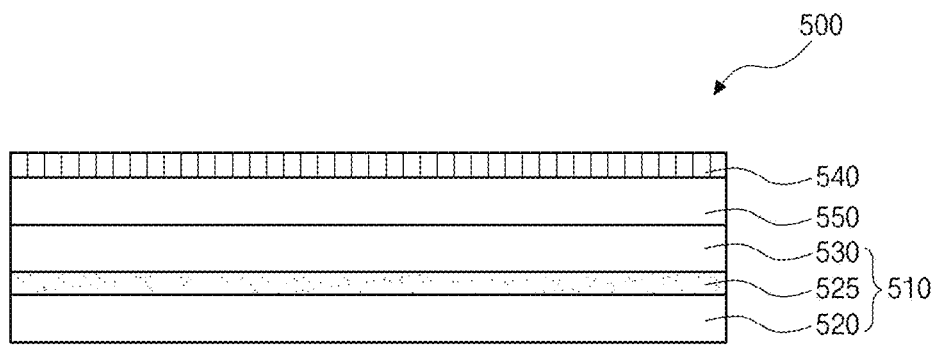

FIGS. 13A and 13B are views schematically illustrating display devices according to a fourth embodiment of the present invention.

Referring to FIG. 13A, in the display device 500, a functional panel 550 may be located on the display panel 510, and a light path controlling member 540 may be located between the display panel 510 and the functional panel 550.

The light path controlling member 540 may include a plurality of light path portions transmitting a picture output from the display panel 510, and the plurality of light path portions may be formed periodically or non-periodically over the light path controlling member 540. Further, the light path portions may be arranged irregularly with the light path portions being satisfied with the above conditions 1 and 2.

As the functional panel 550, various panels such as a FPR (Film Patterned Retarder) panel or parallax barrier panel for a 3D (three dimension), a touch panel to facilitate an information input, and a cover glass to protect the display panel 510, may be used.

Even though not shown in the drawings, the function panel 550 may be attached onto a front surface using an adhesive.

Referring to FIG. 13B, in the display device 500, a functional panel 550 may be located on the display panel 510, and a light path controlling member 540 may be located on the functional panel 550.

The light path controlling member 540 may include a plurality of light path portions transmitting a picture output from the display panel 510, and the plurality of light path portions may be formed periodically or non-periodically over the light path controlling member 540. Further, the light path portions may be arranged irregularly with the light path portions being satisfied with the above conditions 1 and 2.

As the functional panel 550, various panels such as a FPR (Film Patterned Retarder) panel or parallax barrier panel for a 3D (three dimension), a touch panel to facilitate an information input, and a cover glass to protect the display panel 510, may be used.

According to the above embodiments of the present invention, by placing the light path controlling member on the front surface of the display device, a periodicity of a picture output from the display device is lost, and thus a moire happening in a shot picture when inspecting the display device can be prevented. As a result, errors being produced in a decision of a good picture quality and a picture compensation by the moire when inspecting the display device can be prevented.

Further, in the above embodiments, because monochromatic lights having different radiation angles have limited output angles by the light path controlling member, a color uniformity according to a viewing direction can be improved.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
a display panel including a plurality of pixel regions and displaying a picture; and
a light path controlling member located on a front surface of the display panel and transmitting the picture output from the display panel,
wherein the light path controlling member includes a plurality of separation walls and a plurality of light path portions between the plurality of separation walls,
wherein a period of the light path portion is different from a period of the pixel region,
wherein the period of the light path portion is non-periodic,
wherein the period of the light path portion is satisfied with conditions 1 and 2,
wherein the condition 1 is $P_{Oe}=(1/k) \times P_d$, d and the condition 2 is $$\frac{P_d}{k+0.1} \leq P_O \leq \frac{P_d}{k-0.1},$$

where Po is an individual period of the light path portion, Poe is an average period of the light path portion, Pd is the period of the pixel region, and k is a period ratio of the light path portion and the pixel region, wherein $2.6 \leq k \leq 3.0$.

2. The display device of claim 1, wherein the light path portion is formed of an optical fiber, and the separation wall is formed of a polymeric material.

3. The display device of claim 1, wherein the display panel includes a first substrate, a second substrate, and a display element between an inner surface of the first substrate and an inner surface of the second substrate, and
wherein the light path portion is located on an outer surface of the second substrate.

4. The display device of claim 1, wherein the display panel includes a first substrate, a second substrate, and a display element between an inner surface of the first substrate and an inner surface of the second substrate, and
wherein the light path portion is located on an inner surface of the second substrate.

5. The display device of claim 1, further comprising a functional panel on the display panel.

6. The display device of claim 5, wherein the light path controlling member is located between an inner surface of the display panel and an inner surface of the functional panel.

7. The display device of claim 5, wherein the light path controlling member is located on an outer surface of the functional panel.

8. The display device of claim 5, wherein the function panel is a FPR (Film Patterned Retarder) panel or parallax barrier panel for a 3D (three dimension), a touch panel to facilitate an information input, or a cover glass.

* * * * *